Figure 1:
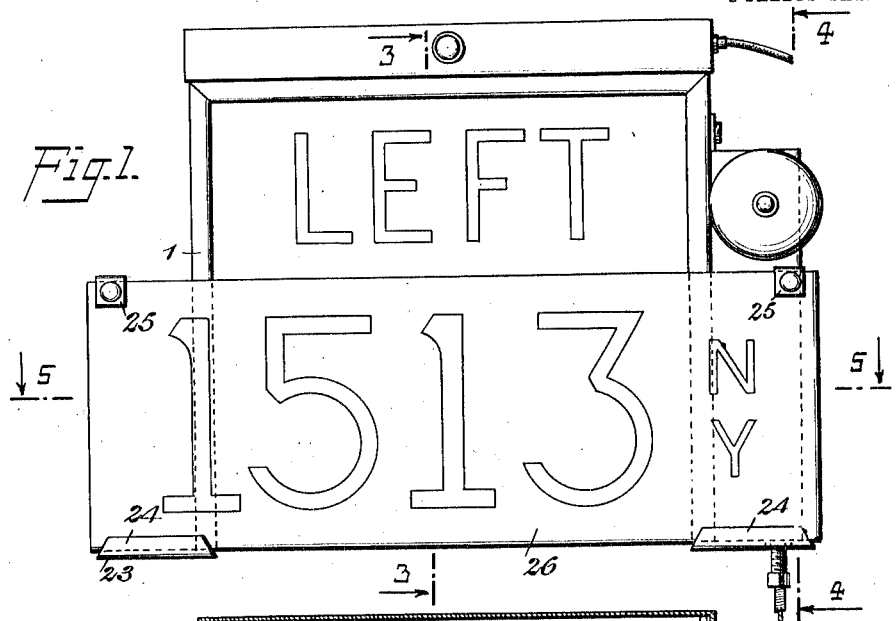

R. D'ANTONIO.
AUTOMOBILE SIGNAL DEVICE.
APPLICATION FILED JAN. 23, 1914.

1,106,179.

Patented Aug. 4, 1914.
2 SHEETS—SHEET 1.

WITNESSES
George L. Blume.
A. L. Kitchin.

INVENTOR
Remigius D'Antonio
BY
ATTORNEYS

R. D'ANTONIO.
AUTOMOBILE SIGNAL DEVICE.
APPLICATION FILED JAN. 28, 1914.
1,106,179.
Patented Aug. 4, 1914.
2 SHEETS—SHEET 2.
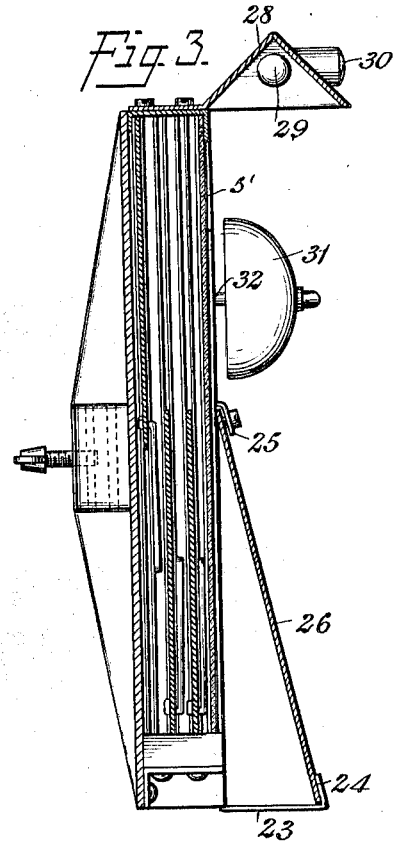
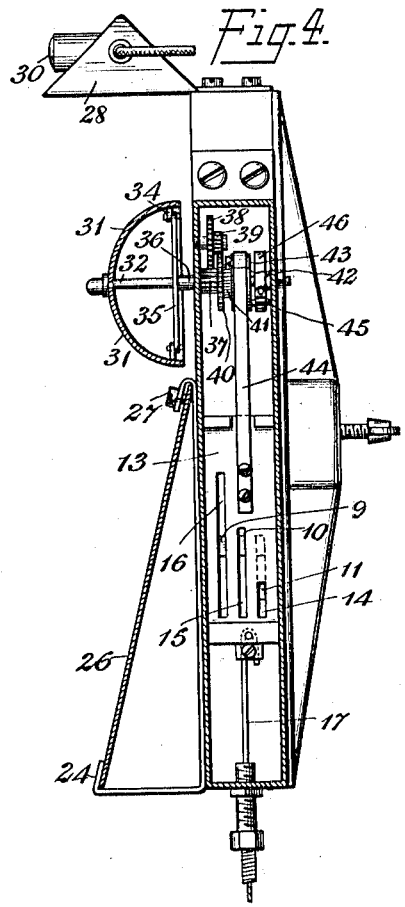
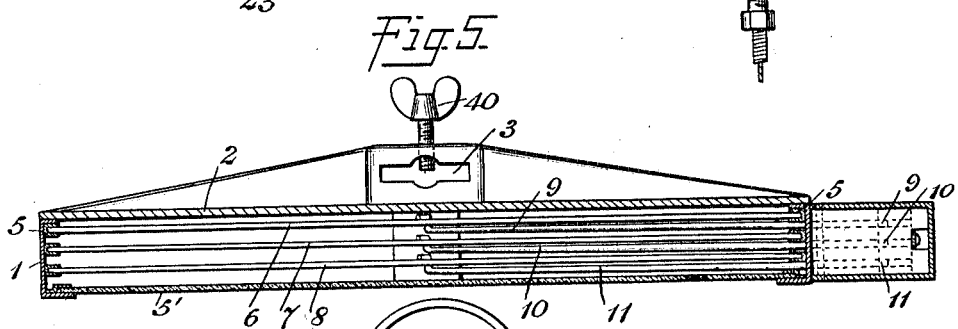
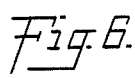
WITNESSES
INVENTOR
Renagius D'Antonio
BY
ATTORNEYS

UNITED STATES PATENT OFFICE.

REMIGIUS D'ANTONIO, OF NEW YORK, N. Y.

AUTOMOBILE SIGNAL DEVICE.

1,106,179.

Specification of Letters Patent. Patented Aug. 4, 1914.

Application filed January 23, 1914. Serial No. 814,010.

*To all whom it may concern:*

Be it known that I, REMIGIUS D'ANTONIO, a subject of the King of Italy, and a resident of the city of New York, borough of Manhattan, county and State of New York, have invented a new and Improved Automobile Signal Device, of which the following is a full, clear, and exact description.

This invention relates to improvements in automoblie signal devices, and has for an object to provide an improved structure for shifting a plurality of signs, said signs being arranged either in the front or rear of an automobile so as to indicate to an adjacent automobile or vehicle the intention of the driver.

Another object of the invention is to provide a plurality of signs which may be arranged in the back or front of an automobile, said signs being adapted to be operated by a signal lever, which lever may be moved different distances for raising the respective signs, said lever being arranged either in the form of a hand operated member or a foot operated member.

A still further object of the invention is to provide a rear signal or sign on the back of an automobile, whereby not only will a visual signal be displayed but an alarm will be sounded when the driver of the machine carrying the signal slows down or turns to the right or left.

In carrying out the object of the invention a suitable frame is provided in which a plurality of signals are arranged, as for instance signal boards carrying the words "Right" "Left" "Stop." In front of these signal boards when the same are in an inoperative position is arranged a license tag. Associated with the license tag and the signal boards is a lamp for continually lighting the license tag, and for lighting the signal boards whenever the same are raised to a position above or from in back of the license tag. An arm for each of the signal boards is provided which is provided with a sliding operating member actuated by a suitable cord, as for instance what is known as a Bowden cord or Bowden wire. This flexible member is operated by a suitable arm or lever secured to the automobile at the front, as for instance on the shaft of the steering wheel so as to be convenient for the operator. When the sliding member is operated by the flexible member for shifting one of the sign boards, a belt or tape is pulled which winds a spring associated therewith, and also which operates a train of gearing connected with a bell so as to cause the bell to sound during the movement of the flexible member. Thus it will be seen that a single operation of the signal lever will produce a visual sign, and will sound an alarm for calling attention to the sign.

Figure 2:
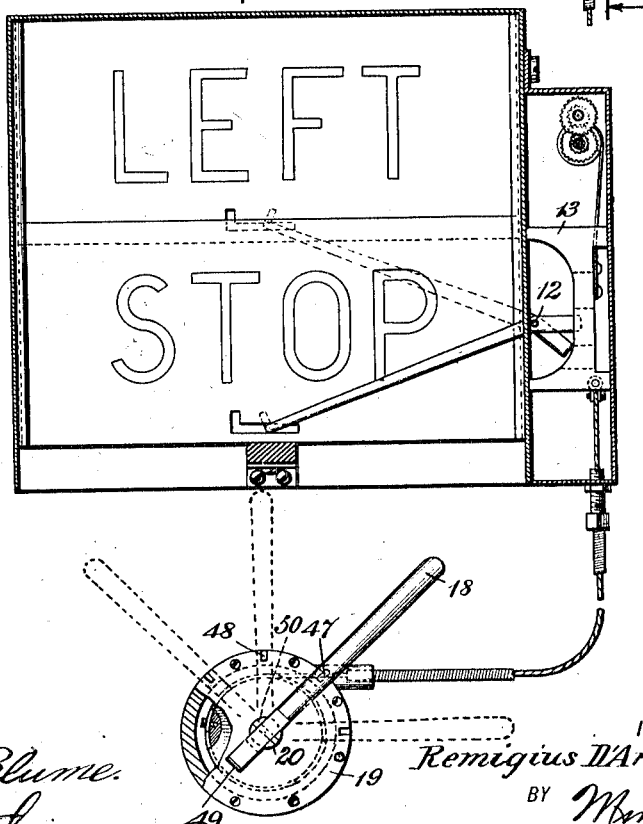

In the accompanying drawings—Figure 1 is a rear view of a signal device adapted to be secured to the rear of an automobile; Fig. 2 is a longitudinal vertical section through the structure shown in Fig. 1, the operating means being shown in connection therewith; Fig. 3 is a section through Fig. 1 on line 3—3; Fig. 4 is a section through Fig. 1 taken approximately on line 4—4; Fig. 5 is a section through Fig. 1 approximately on line 5—5; and Fig. 6 is a top plan view of the controlling lever and support therefor.

Referring to the accompanying drawings by numeral 1 indicates a framing, and 2 a rear support which is provided with an opening 3 and a clamping screw 4 for securing the device in position on any suitable bracket connected with the rear part of the automobile. Arranged in the framing 1 are a plurality of guiding members 5 adapted to carry signs 6, 7 and 8, respectively, as clearly shown in Fig. 5. Sign 6 is provided with an operating arm 9, sign 7 with an operating arm 10, and sign 8 with an operating arm 11. All of these arms are pivotally mounted upon pin 12, as shown in Fig. 2, and are provided with extensions which project into a sliding bar 13. The sliding bar 13 is provided with slots 14, 15 and 16, these slots being all of different lengths. The end of lever 9 extends into slot 14, while the ends of levers 10 and 11 extend into slots 15 and 16, respectively. By this structure when the wire 17 is pulled downwardly the end of bar 9 is first operated, whereby the sign 6 is elevated. A continued movement of wire 17 will cause sliding bar 13 to move downwardly and operate arm 10 for raising the signboard 7. A still further movement will cause the movement of arm 11 and the raising of signboard 8. The signboard 6 could be provided with the word "Right" while the signboards 7 and 8 could be provided with the words "Left" and "Stop," respectively. By this means when it is desired to turn to the right, lever 18 could be moved from the lower dotted position shown in Fig. 2 to the full line position shown in Fig. 2. However, if the driver should desire to turn to the left the movement of lever 18 would be continued until it occupied the dotted position shown in Fig. 2, which is at right angles to the lower position. A further movement of lever 18 will cause the word "Stop" to be elevated. If it is desired to raise the sign carrying the word "Stop" in the first instance lever 18 is moved over quickly to an extreme position, whereupon all of the signboards will be raised substantially simultaneously but the word "Stop" will be in front, or rather will be facing the rear so as to be open to view. The support 19 is clamped to any suitable part of the front of the automobile, as for instance to the shaft carrying the steering wheel, whereby the driver or operator may easily manipulate handle 18. Handle 18 is rigidly connected with shaft 20, which shaft carries a pulley 21 arranged in the housing of clamp 19, which pulley has secured thereto the end of wire 17 so that the wire 17 will be wound upon pulley 21 as lever 18 is moved over. The wire 17 of course is covered with a flexible member 22, as is usual with wires of this kind, so that motion from handle 18 can be communicated to member 13.

Secured to the framing 1 by any desired means, as for instance suitable screws, are brackets 23 which are provided at their lower ends with turned-up members 24, and at the upper end with turned-down members 25. The turned-up members 24 form a stop or brace for limiting the downward movement of the license plate 26, while the members 25 carry set screws 27 for clamping the plate 26 against movement. It will be observed that the members 24 and 25 overlap the upper and lower edges, respectively, of plate 26, but do not engage the under edges. This allows a name plate of any desired size to be used as the plate may extend beyond the member 25 as far as necessary. If a license plate should be of less length than the distance between members 25 it will be necessary to either lengthen the plate or move the brackets 23 closer together.

Bolted or otherwise secured to the top of framing 1 is a casing 28 which carries a lamp 29 which is designed to shine through the window 30 toward the rear, and also is designed to shine downwardly and illuminate license plate 26 and also the boards 6, 7 and 8 whenever the same are raised. It will be observed from Figs. 3 and 4 that the license plate 26 is arranged at an angle, whereby the light from lamp 29 may more properly fall thereon.

Referring to bell 31 and associated parts it will be observed that the same is provided with a stationary support 32, a gong 33 and hammers 34 which are pivotally mounted upon a rotating bar 35 rigidly secured to the rotatable sleeve 36. Sleeve 36 is loosely mounted on shaft 32, and has rigidly secured thereto a pinion 37 meshing with gear wheel 38. Gear wheel 38 has rigidly secured thereto pinion 39 meshing with gear wheel 40, which gear wheel is loosely mounted upon shaft 32, and has rigidly secured thereto a ratchet wheel 41 coacting with the pivotally mounted pawl 42. Pawl 42 is pivotally mounted upon the drum 43, to which the belt or tape 44 is secured, whereby when belt or tape 44 is pulled downwardly by member 13 drum 43 will be rotated and power will be transmitted therethrough from pawl 42 to ratchet wheel 41, and from thence through the train of gearing associated therewith to the sleeve 36 for causing a proper operation of bar 35 and hammers 34. Drum 43 has also connected therewith a pin 45 which has looped thereover the end of spring 46, which has the opposite end secured to the stationary shaft 32, whereupon the spring will be wound whenever drum 43 is rotated under the action of tape 44 and member 13. When member 13 is released spring 46 will actuate drum 43 so as to rewind tape 44 and raise member 13, pawl 42 slipping over ratchet wheel 41 and thereby not affecting the bell 31. In order to prevent spring 46 from moving member 13 back at the wrong time lever 18, shown in Figs. 2 and 6, is provided with a lug or extension 47 adapted to snap into any of the notches 48. In order to make the lug 47 properly snap into the respective notches 48, a suitable spring 49 is provided which presses against one end of lever 18 so as to cause the same to turn upon its pivotal securing member 50 and thereby move the opposite end of the lever so that the lug 47 will properly operate. By this construction and arrangement when lever 18 is moved from its inoperative or normal position a signal or signboard will be raised to view, and the gong 33 will be sounded for drawing attention to the fact that a signboard has been brought to view. If the signboard is arranged in the rear of the automobile anyone following will be notified as to the intention of the driver, and if the signboard is arranged in front of the machine anyone approaching will likewise be notified of the intention of the driver. It is of course evident that a signal device could be arranged in front of the automobile, and also one in the rear, and connected up so as to operate synchronously, and thereby present signs simultaneously in the front and rear. In connection with the signs, it will be observed from Fig. 5 that a suitable glass panel 5' is provided for protecting the signs against the elements, and also for preventing dirt and foreign matter from entering the casing or framing 1.

What I claim is—

1. In a vehicle signaling device, the combination of a frame arranged to be connected to the rear portion of a vehicle, a plurality of guides arranged in said frame, a plurality of signals arranged in said frame and guided in their movement by said guides, a movable arm for each of said signals for moving the signals to a point where they are disclosed to view, a pull arranged adjacent the seat of said vehicle, and a sliding connecting member connected with said pull and said sliding connecting member being formed with slots of different lengths whereby said arms are successively engaged and moved into view.

2. A vehicle signaling device comprising a supporting frame, a plurality of signals slidingly fitting into said frame, a movable arm for actuating each of said signals, a sliding member for actuating said arms, said sliding member being provided with slots of different lengths for successively engaging said arms and moving the same, a pull member and a connection between the pull member and said sliding member, whereby said sliding member may be moved to any desired extent for actuating any of said signals.

3. In a vehicle signaling device, the combination of a frame arranged to be connected to the rear portion of a vehicle, a series of visual signals slidingly fitting into said frame, a pivotally mounted arm for each of said signals formed with an operating extension, a sliding member having slots for accommodating said operating extensions, said slots being of different lengths, whereby a certain movement will cause one of said signals to be raised, a further movement a second signal, and so on, a pull member arranged adjacent the seat of said vehicle, a connection between said pull member and said operating slide for moving said slide in one direction, a drum and belt for moving said slide in the opposite direction, a spring for actuating said drum and belt, and means associated with said belt for sounding an alarm each time said sliding member is actuated.

In testimony whereof I have signed my name to this specification in the presence of two subscribing witnesses.

REMIGIUS D'ANTONIO.

Witnesses:
  A. L. KITCHIN,
  PHILIP D. ROLLHAUS.